April 15, 1958 K. KORSAK ET AL 2,830,609
HYDRAULICALLY PRESSURIZED COMPENSATOR
Filed April 20, 1956 3 Sheets-Sheet 1

Inventors
K. KORSAK   L.M. TRELEMAN
By~ Maybee & Legris
Att'ys

April 15, 1958  K. KORSAK ET AL  2,830,609
HYDRAULICALLY PRESSURIZED COMPENSATOR
Filed April 20, 1956  3 Sheets-Sheet 2

Inventors
K. KORSAK   L. M. TRELEMAN
By Maybee & Legris
Att'ys

April 15, 1958 K. KORSAK ET AL 2,830,609
HYDRAULICALLY PRESSURIZED COMPENSATOR
Filed April 20, 1956 3 Sheets-Sheet 3

Inventors
K KORSAK  L.M. TRELEMAN
By~ Maybee & Legris
Att'ys

United States Patent Office

2,830,609
Patented Apr. 15, 1958

2,830,609

HYDRAULICALLY PRESSURIZED COMPENSATOR

Kazimierz Korsak, North York County, Ontario, and Lionel Mervyn Treleman, Toronto, Ontario, Canada, assignors to Avro Aircraft Limited, Malton, Ontario, Canada, a corporation Application April 20, 1956, Serial No. 579,521

5 Claims. (Cl. 137—171)

This invention relates to reservoirs for hydraulic systems and more particularly to a reservoir for an aircraft hydraulic system which excludes air from contact with the hydraulic fluid and at the same time, compensates for changes of fluid volume in the system.

Until recently, aircraft hydraulic system reservoirs have been relatively simple, being little more than tanks with a two-way relief valve or vent to allow for pressure changes due to altitude and atmospheric conditions. An air space was required principally to make provision for the fluctuating fluid content of the reservoir due to operation of hydraulic services and consequent ram displacement. Due to the presence of air it was possible, under certain flight conditions, for the pump to be starved of fluid momentarily and to suck air, thereby causing air locks which resulted in spongy or sluggish operation of the hydraulic services. Most hydraulic systems of this type were designed so that these air locks would work through the idling circuit of the pump, back to the reservoir but the possibility was always present that they would reach the service jacks.

With the advent of power operated or assisted flying controls requiring continuous positive operation, the increase in operating altitudes and the higher operating temperature and pressure of hydraulic systems, it has become desirable to design "airless" hydraulic systems since at the low pressures of high altitude and the high temperatures of the hydraulic fluid the fluid oxidizes very readily. It is also necessary to positively prevent air locks in the services since a majority of these services are vital to the safe operation of the aircraft. A known type of airless reservoir comprsies a cylinder in which a spring loaded piston acts on the fluid therein and allows for fluctuation of fluid volume. The fluid is pressurized in the suction line to the pump to remove the possibility of starvation of the pump. However, there are no means for separating from the fluid any air which may be held in suspension in the fluid.

In the invention described herein it is an important object to provide a reserve of fluid for operation of an hydraulic system in an aircraft in which air is excluded from contact with the fluid.

An hydraulic system in an aircraft must function in any attitude, at any altitude and under diverse G-loads and it is therefore a further object of the invention to pressurize the fluid in the reservoir and suction line to the hydraulic pump in order to prevent starvation of the pump under the above mentioned conditions.

Another object is to provide means to compensate for changes in fluid volume in the system due to temperature and pressure changes, the actuation of components, or leakage.

A still further object of the invention is to provide means to remove any air dissolved in or held in suspension in the fluid which would otherwise collect to form air locks and cause sluggish operation of the system.

In view of the fact that the primary objects of the invention are attained by pressurizing the fluid in the reservoir, and since according to a part of this invention, the pressurizing force is obtained by hydraulic means, it is another important object to provide an alternate source of pressure to act as a safety measure should the normal source of pressure fail, or suffer pressure drops during certain operating conditions.

Other objects and advantages of the invention will be apparent to those skilled in the art by referring to the drawings which form a part of this description and in which like reference characters indicate corresponding parts throughout.

Figure 1:
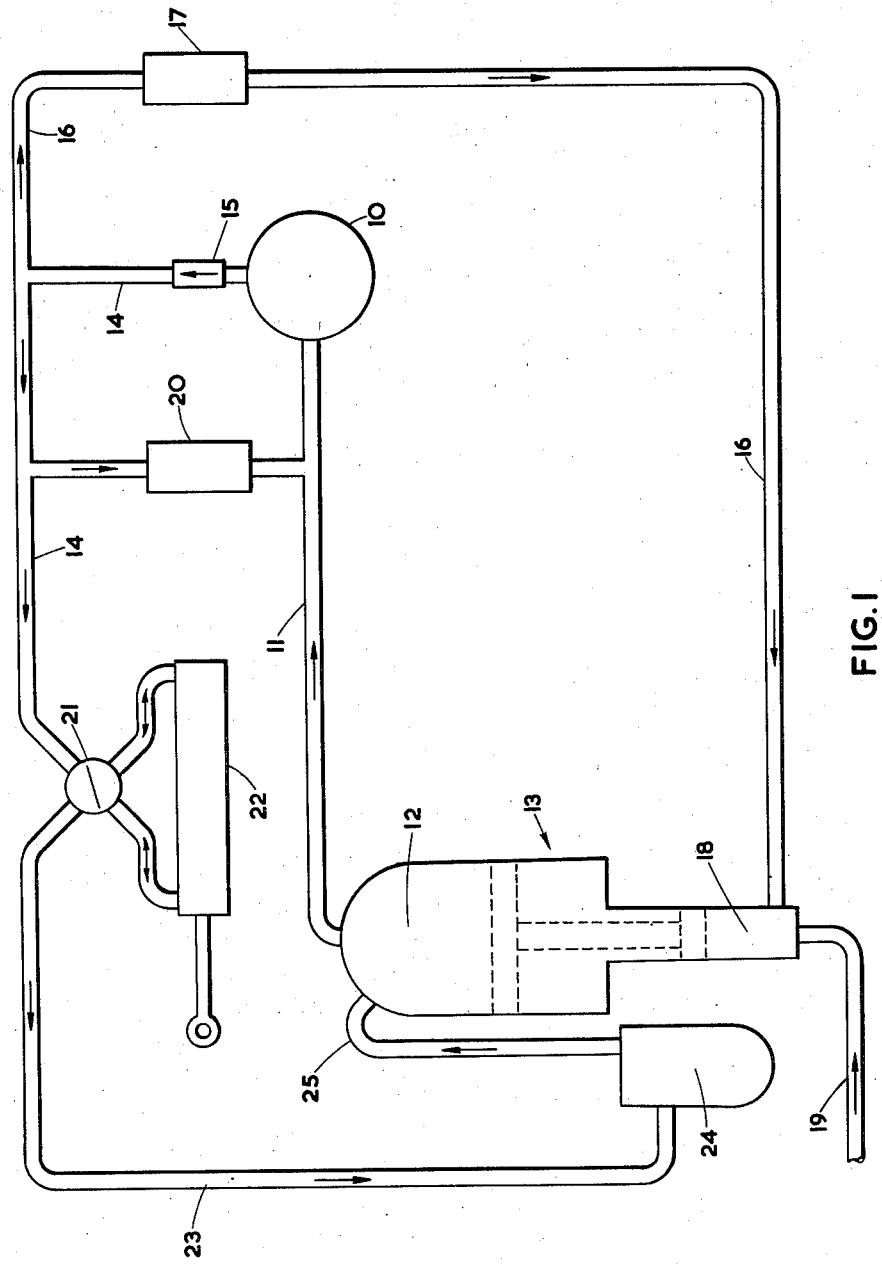
Figure 1 is a schematic drawing of a basic airless hydraulic system utilizing an hydraulic compensator made in accordance with the present invention.

In Figure 1 a pump 10 is shown drawing fluid through a suction line 11 from the reservoir side 12 of a compensator 13. This pump delivers fluid to pressure line 14 through a non-return valve 15. A pressure relief valve 20 lies across lines 11 and 14 to relieve excess pressure from the pump 10. The pressure line 14 delivers fluid under the pressure of the pump 10 to a control valve 21 which controls the entry of fluid to the hydraulic jack 22. Fluid exhausted from the jack 22 flows back through the control valve 21, through line 23, filter 24, line 25 to the reservoir side of the compensator 13. The reservoir side of the compensator contains the supply of fluid contained in the system just described and maintains it under pressure by hydraulic means which will be described in greater detail below. However, from Figure 1 it can be seen that a conduit 19 delivers hydraulic fluid under pressure from the main hydraulic system of the aircraft to the pressure side 18 of the compensator 13 where it exerts a pressurizing force upon the reservoir of the compensator through a piston arrangement shown only in dotted lines in this figure. In addition, conduit 14 leading from the pump 10 is branched to lead also to line 16 which carries fluid through a pressure reducing valve 17 to the pressure side 18 of the compensator. The fluid in line 16 is normally prevented from entering the pressure side 18 of the compensator 13 by a valve which is held closed by the pressure of fluid in line 19. If this source of pressure should fail, however, the fluid in line 16 constitutes an alternate source of pressure for the compensator.

Figure 2:
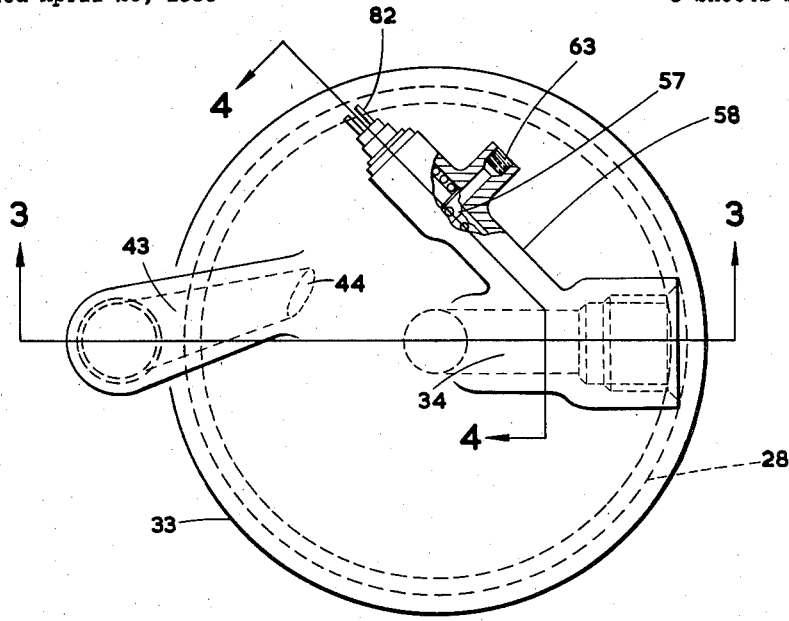
Figure 2 is a plan view of the hydraulically pressurized compensator.
Figure 3:
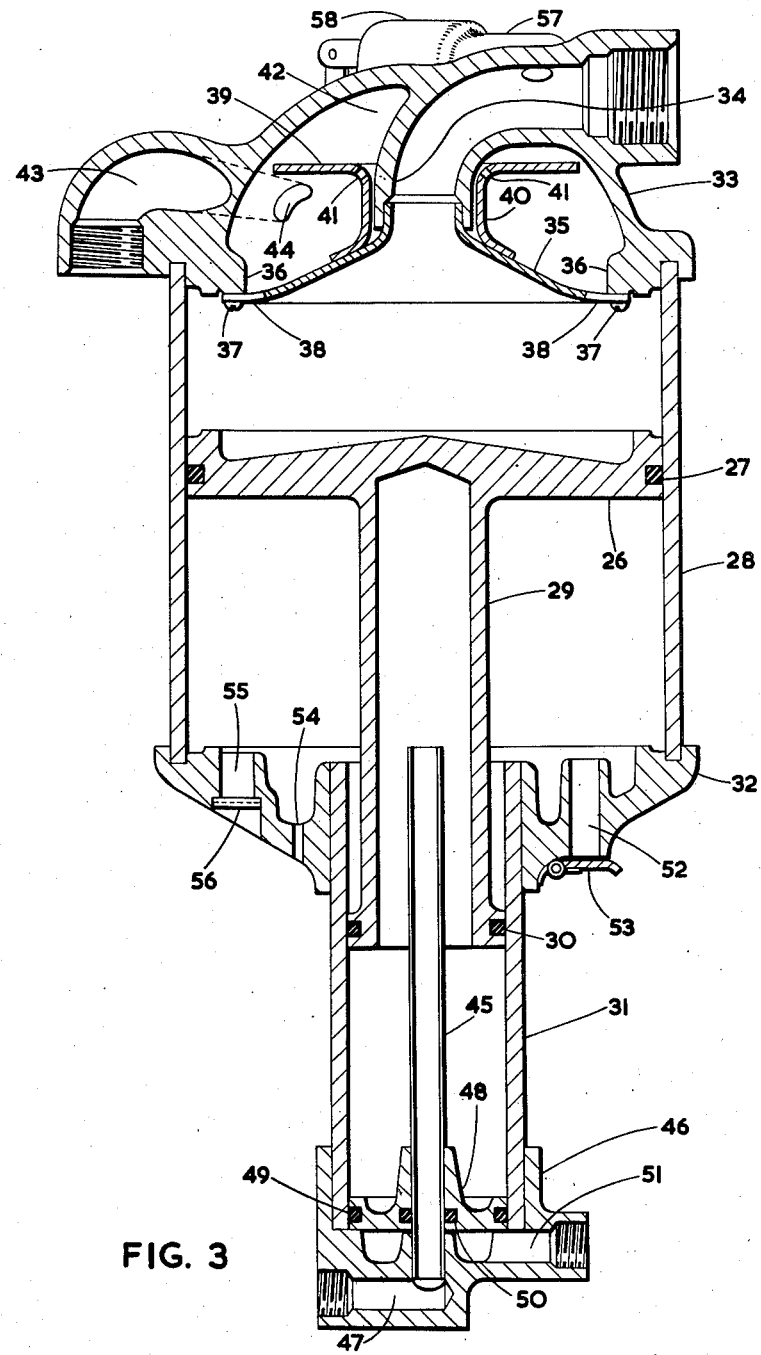
Figure 3 is a side elevation in cross-section along line 3—3 in Fig. 2.

Referring now to Figures 2 and 3, the compensator 13 is shown as consisting of a large piston 26 carrying an O-ring seal 27 around its peripheral edge and sliding in a reservoir cylinder 28. A hollow ram 29 is concentrically fixed to the underside of the piston 26 and carries an O-ring seal 30 sliding in a smaller diameter pressure cylinder 31, the upper end of which is fixedly attached to a base 32 of the reservoir cylinder 28 so that the two cylinders lie in tandem with their axes parallel to one another. A domed head 33 on the upper end of the reservoir cylinder 28 has a central outlet duct 34 depending therefrom. Secured to the outlet duct 34 is a shallow frusto-conical sheet metal baffle plate, the outside diameter of which is substantially smaller than the inner diameter of the rim of the domed head 33 at its junction with the reservoir cylinder 28. The baffle plate 35 is attached to lugs 36 projecting from the inner rim of the domed head 33 at four equi-angular stations, by means of screws 37 which pass through tabs 38 formed on the periphery of the baffle plate. A further planar disc baffle 39 situated approximately mid-way between the highest point of the domed head 33 and the baffle 35, is fixedly attached to the latter concentrically with the outlet duct 34 by a flanged cylindrical portion 40 formed on the baffle 39. The outside diameter of the baffle plate 39 is substantially smaller than the diameter of the domed head at that point and four air-leak holes 41 are equi-angularly spaced around the radius formed at the junction of the disc and the cylindrical portion. An air separation chamber 42 is thereby defined by the domed head 33 and the baffle 35.

The inlet duct 43, cast integrally with the domed head 33 is tapered towards a port 44 which leads into the air separation chamber 42 and is disposed substantially tangentially to it.

Centrally disposed in the smaller pressure cylinder 31 and extending its full length is a stack-pipe 45 which is mounted in a substantially cylindrical lower end cap 46, and which is in communication with duct 47. Sliding on the stack-pipe 45 and in contact with the walls of the cylinder 31 is a floating piston 48 carrying O-ring seals 49 and 50. The space within cylinder 31 and below the floating piston 48 is in communication with a duct 51.

The annular end plate 32 of the large reservoir cylinder 28 acts as a sump and is pierced by a measuring rod opening 52 which is covered externally by a spring loaded flap 53. A drain hole 54 and a breather vent 55 are also provided in the end plate. The breather vent 55 is protected by a filter 56.

A combination relief and manual bleed valve assembly 57 is contained in a casing 58 which is cast integrally with the domed head 33. The valve casing contains a large bore 59 in tandem with a smaller concentric bore 60 which communicates by means of drillings 61 and 62 with the outlet duct 34 and the air separation chamber 42 respectively. An outlet passage 63 (shown in the sectioned portion of Fig. 2 for clarity) communicates between the large bore 59 and atmosphere. The valve assembly 57 comprises a hollow first valve body 64 with a conical valve face 65 spring loaded by a coil spring 66 against a valve seat 67 formed at the junction of the large bore 59 and small bore 60 whilst holes 68 drilled radially in the conical valve face 65 above the seating station allow communication between the hollow bore of the valve body 64 and bore 59 within which the valve lies. A hollow extension 69 at the head of the first valve body 64 is provided with holes 70 for communication between its bore and the bore 60 and is slidable therein on guide splines 71. Slidably fitted in the bore of the extension 69 is a second conical valve head 72, which is spring loaded by a coil spring 73 against a valve seat 74 formed at the junction of the bore 60 and drillings 61. Carried in the hollow body of the first valve 64 is a ball valve 75 which is spring loaded by a coil spring 77 against the seat 76 formed at the junction of the bores of the valve body 64 and extensions 69. The ball valve and spring are retained in the hollow valve body 64 by a screwed plug and valve limiting stop 78. The whole valve assembly is retained in the large bore 59 by a threaded retaining sleeve 79. A bell crank 80 pivotally mounted on a lug 81 which is cast integrally with the domed head 33 is operatively connected for the actuation of the valve assembly by means of a clevis 82.

In operation, hydraulic fluid from the return side of the jack 22 passes through the filter 24, line 25 and enters the air separation chamber 42 at a tangent through the constricted duct 43 and port 44 increasing in velocity as it does so. A swirling motion to the fluid is set up in the air separation chamber 42 and centrifugal force will cause the denser fluid to flow outwardly in the chamber while any occluded air, or air bubbles, held in suspension in the fluid, will accumulate in the central portion below the baffle 39, leak through the holes 41 and collect at the highest point of chamber 42. From this point the air will either bleed off to atmosphere during self operation of the relief valve 57 or by manual operation on the ground.

The position of piston 26 in the reservoir cylinder 28 is governed by the volume of fluid in the entire system (the designed maximum capacity of the compensator itself in this preferred embodiment is 475 cubic inches), and may be ascertained for servicing purposes by means of a dip rod inserted through duct 52. An O-ring 27 maintains a fluid-tight seal between the piston 26 and the reservoir cylinder wall 28. The base 32 forms a sump for collecting any leakage from the reservoir chamber past the piston and it is provided with a drain hole 54 which would normally be connected to an overboard drain pipe. Aspiration of the sump to maintain constant air pressure therein during piston travel or change of altitude is through a breather vent 55 provided with an air filter 56.

The delivery of fluid from the reservoir is through the central right angled duct 34.

Fluid from the aircraft main hydraulic system at a normal pressure of approximately 1,500 pounds per square inch enters pressure cylinder 31 through duct 47 and stack-pipe 45. The floating piston 48 is forced to the bottom of pressure cylinder 31 and the pressure acting on the hollow ram 29 forces piston 26 upwardly in the reservoir cylinder 28 pressurizing the fluid above it to about 90 pounds per square inch. It is calculated that the seal friction on the moving components will be equivalent to approximately 40 pounds per square inch acting on piston 26 in a direction opposing piston travel. Thus the system pressure could vary between 50 pounds per square inch and 130 pounds per square inch before friction is overcome and the movement of the piston restores the pressure closer to the normal of 90 pounds per square inch.

Fluid from the pressure line 14 is piped through a pressure reducing valve 17 (where it is reduced to approximately 1,250 pounds per square inch), into the space below the floating piston 48 through duct 51. The floating piston is normally held at the bottom of the cylinder by the superior pressure of 1,500 pounds per square inch from the normal source, but should this pressure fail or fall below that of the alternative source, the floating piston 48 will be forced up the pressure cylinder 31 against the bottom of the hollow ram 29 where it will maintain a pressurizing force on the piston 26. The resultant pressure of the fluid in the reservoir cylinder is about 75 pounds per square inch and this is due to the smaller effective piston area and the lower fluid pressure, the use of which ensures that the floating piston 48 will remain at the bottom of the cylinder 31 except in the emergency cases recited above.

Figure 4:
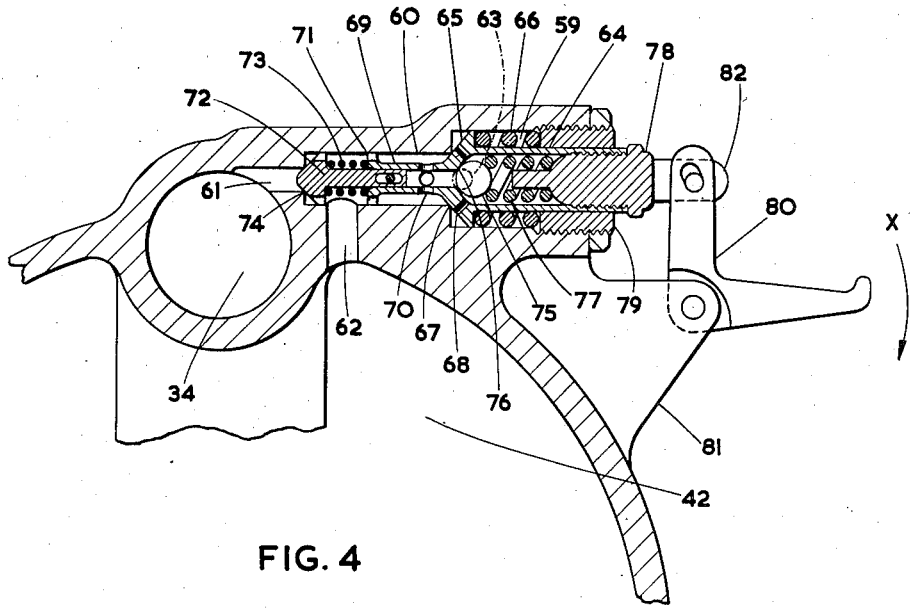
Figure 4 is a side elevation in cross-section of the relief valve taken along line 4—4 in Fig. 2.

Relief against over-pressurization, and air bleed control in the reservoir side of the compensator is provided by a combination relief and manual bleed valve 57 carried in the casing 58 integral with the head 33. The pressure relief valve (ball valve 75) is set at a spring compression of approximately 165 pounds per square inch and when the pressure in the reservoir exceeds this figure any air trapped in chamber 42 will pass up drilling 62, along bore 60, past the guide spline 71, through holes 70 and up the bore of extension 69 blowing the ball valve 75 off its seat 76. The air then passes through holes 68 to bore 59 and out to atmosphere through the outlet duct 63. The air is followed by fluid until the excess pressure in the reservoir drops below 165 pounds per square inch when the ball valve 75 will seat again. During normal operation of the compensator, air trapped in chamber 42 is prevented from entering outlet duct 34 by a valve 72 which remains seated. When it is desired to bleed the reservoir manually, bell crank 80 operated in the direction of the arrow X shown in Figure 4, withdraws the whole valve assembly against the action of spring 66. Excess fluid is then bled off through drilling 61, past valve 72, through drilling 62, bore 60 and past valve face 65 into bore 59. From thence it dumps to atmosphere through duct 63. The whole valve assembly returns to normal (all valves seated) under the action of spring 66 upon release of the bell crank 80.

Although there has been herein shown and described a preferred embodiment of the invention it will be understood that changes in shape, size and arrangement of parts may be made without departing from the spirit of the invention or the scope of the appended claims.

What we claim as our invention is:

1. An hydraulically pressurized fluid reservoir comprising a first larger diameter cylindrical reservoir chamber and a second smaller diameter cylindrical pressure chamber, the two chambers lying in tandem and being coaxial, the reservoir chamber having a domed head at one end and, at the other, an annular plate surrounding the end of the pressure cylinder, a piston slidable in the reservoir chamber and rigidly held in spaced relationship with a second piston slidable in the pressure cylinder, a fluid inlet port directing fluid into the domed head, substantially tangentially to its wall and a fluid outlet port depending from the domed head and coaxial therewith, the opening of the outlet port being lower than the upper surface of the domed head, a spring loaded relief valve in communication with the uppermost portion of the domed head and a fluid pressure source in communication with the end of the cylindrical pressure chamber remote from the reservoir chamber.

2. An hydraulically pressurized fluid reservoir comprising a first larger diameter cylindrical reservoir chamber and a second smaller diameter cylindrical pressure chamber, the two chambers lying in tandem and being coaxial, the reservoir chamber having a domed head at one end and, at the other, an annular plate surrounding the end of the pressure cylinder, a piston slidable in the reservoir chamber and rigidly held in spaced relationship with a second piston slidable in the pressure cylinder, a fluid inlet port directing fluid into the domed head substantially tangentially to its wall and a fluid outlet port extending into the domed head from the upper surface thereof and lying coaxial therewith, the opening of the outlet port being lower than the upper internal surface of the domed head, a shallow frusto-conical baffle plate surrounding the outlet port and extending radially towards the rim of the domed head, a spring loaded relief valve in communication with the uppermost portion of the domed head and a fluid pressure source in communication with the end of the cylindrical pressure chamber remote from the reservoir chamber.

3. An hydraulically pressurized fluid reservoir comprising a first larger diameter cylindrical reservoir chamber and a second smaller diameter cylindrical pressure chamber, the two chambers lying in tandem and being coaxial, the reservoir chamber having a domed head at one end and, at the other end, an annular plate surrounding the end of the pressure cylinder, a piston slidable in the reservoir chamber and rigidly held in spaced relationship with a second piston slidable in the pressure cylinder by means of a hollow ram, a fluid inlet port directing fluid into the domed heads substantially tangentially to its wall and a fluid outlet port extending into the domed head from the upper surface thereof and lying substantially coaxial therewith, a shallow frusto-conical flange surrounding the outlet port and extending radially to the rim of the domed head, a second planar baffle plate surrounding the outlet port and lying substantially mid-way between the uppermost point of the domed head and the frusto-conical baffle plate and extending radially towards the domed wall, a spring loaded relief valve in communication with the uppermost portion of the domed head and a fluid pressure source in communication with the interior of the hollow ram separating the two pistons.

4. An hydraulically pressurized fluid reservoir comprising a first larger diameter cylindrical reservoir chamber and a second smaller diameter cylindrical pressure chamber, the two chambers lying in tandem and being coaxial, the reservoir chamber having a domed head at one end and at the other end an annular plate surrounding the end of the pressure cylinder, a piston slidable in the reservoir chamber and rigidly held in spaced relationship with a second piston slidable in the pressure cylinder by means of a hollow ram open at the end adjacent the pressure cylinder, a fluid inlet port directing fluid into the domed head substantially tangentially to its wall and a fluid outlet port depending from the domed head and coaxial therewith, the opening of the outlet port being lower than the internal surface of the upper portion of the domed head, a spring loaded relief valve in communication with the uppermost portion of the domed head and a fluid pressure source communicating with the interior of the hollow ram joining the two pistons by means of a hollow stack-pipe lying within the pressure cylinder and coaxial therewith, a free floating piston slidable on the stack-pipe and in fluid-tight engagement with the interior wall of the pressure cylinder, and an alternate source of pressure in communication with the interior of the pressure cylinder below the free floating piston.

5. An hydraulically pressurized fluid reservoir as claimed in claim 4 in which the stack-pipe extends the full length of the pressure cylinder.

References Cited in the file of this patent

UNITED STATES PATENTS

| Number | Name | Date |
|---|---|---|
| 1,972,144 | Hapgood | Sept. 4, 1934 |
| 2,397,270 | Kelly | Mar. 26, 1946 |
| 2,417,256 | Kremiller | Mar. 11, 1947 |